Feb. 12, 1957 R. ADLER 2,781,468

TELEVISION RECEIVER

Filed Feb. 18, 1952 4 Sheets-Sheet 1

INVENTOR:
ROBERT ADLER
BY Francis W. Crotty
HIS ATTORNEY.

TELEVISION RECEIVER

Filed Feb. 18, 1952

INVENTOR:
ROBERT ADLER
BY Francis W. Crotty
HIS ATTORNEY.

Feb. 12, 1957 R. ADLER 2,781,468
TELEVISION RECEIVER
Filed Feb. 18, 1952 4 Sheets-Sheet 3
FIG. 6
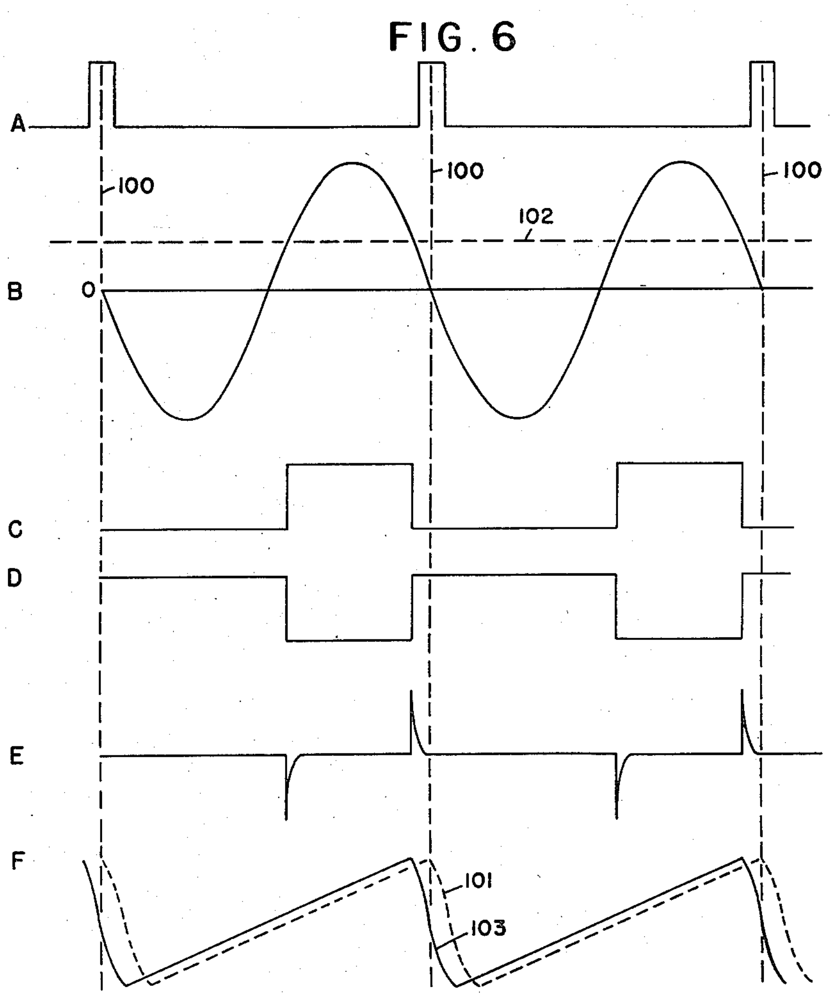
FIG. 11
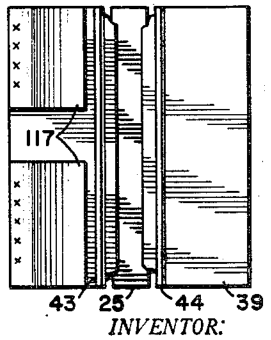
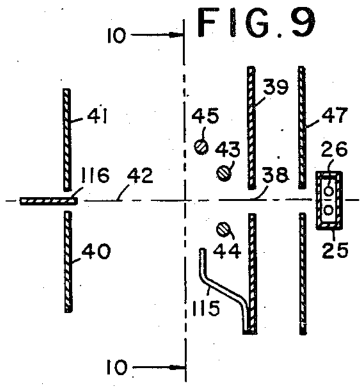
FIG. 10
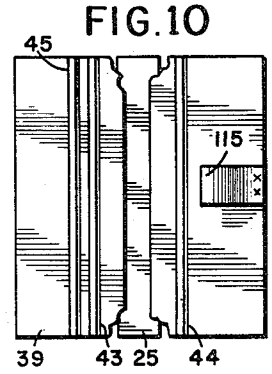
INVENTOR:
ROBERT ADLER
BY Francis W. Crotty
HIS ATTORNEY.

Feb. 12, 1957

R. ADLER 2,781,468

TELEVISION RECEIVER

Filed Feb. 18, 1952

4 Sheets-Sheet 4

INVENTOR:
ROBERT ADLER
BY Francis W. Crotty
HIS ATTORNEY.

United States Patent Office 2,781,468

Patented Feb. 12, 1957

2,781,468

TELEVISION RECEIVER

Robert Adler, Northfield, Ill., assignor to Zenith Radio Corporation, a corporation of Illinois Application February 18, 1952, Serial No. 272,200

13 Claims. (Cl. 313—69)

This invention relates to television receivers and more particularly to synchronizing and automatic gain control systems and to special purpose electron tubes for use in such systems.

In the copending applications of Robert Adler, Serial No. 139,401, filed January 19, 1950, now Patent No. 2,606,300 for "Electron-Discharge Devices," and Serial No. 139,402, filed January 19, 1950, for "Synchronizing-Control Apparatus," now forfeited in favor of a continuation-in-part application Serial No. 267,826, filed January 23, 1952, now Patent 2,684,404 for "Frequency Controllable Oscillating Systems," all assigned to the present assignee, there are disclosed and claimed a novel electron-discharge device and system for use as a synchronizing-control arrangement in a television receiver or the like. In the preferred embodiment, a two-section tube is employed, the first section operating as a synchronizing-signal clipper and balanced line-frequency phase-detector to develop between a pair of anodes a balanced unidirectional control voltage indicative of the phase difference between the local line-frequency oscillator and the incoming line-frequency synchronizing-signal pulses. In the other section of the tube, an electron beam is simultaneously subjected to a sinusoidal magnetic-deflection field energized from the line-frequency sweep output and to a slow lateral displacement in accordance with the balanced unidirectional control voltage developed between the two phase-detector anodes in the first section. In this manner, the duty cycles of two final anodes in the second section of the tube are caused to vary in accordance with the unidirectional control potential developed between the phase-detector anodes of the first section. Either the leading edge or the trailing edge of the developed quasi-square wave is employed to drive the line-frequency sweep system. The output voltages appearing at the phase-detector anodes may be combined and integrated to provide field-frequency output pulses for controlling the field-frequency sweep system, or a separate anode may be provided for this purpose. Thus, a single tube, together with a small number of external circuit elements, performs the several functions of synchronizing-signal separator, automatic-frequency-control (AFC) phase-detector, line-frequency oscillator, and reactance tube, providing a substantial saving in comparison with conventional systems which usually employ three or more tubes to perform these functions.

In the copending application of Robert Adler, Serial No. 242,509, filed August 18, 1951, now Patent No. 2,717,972 for "Television Receiver," and assigned to the present assignee, there are disclosed and claimed a novel tube and system for obtaining both noise-immune synchronizing-signal separation and automatic gain control generation. In a preferred form of this system, a sheet-like electron beam of substantially rectangular cross-section is projected through a deflection-control system toward a target electrode which is provided with a pair of apertures and is followed by plate electrodes for collecting space electrons which pass through the respective apertures.

Detected composite video signals are applied to the deflection-control system in such a manner that space electrons are permitted to pass through the two apertures in the target electrode only during synchronizing-pulse intervals. Moreover, extraneous noise impulses, which are generally of much greater amplitude than the desired synchronizing pulses, cause transverse deflection of the beam beyond the apertures so that space electron flow to the plate electrodes is again interrupted. One of the plate electrodes is employed to derive noise-immune output current pulses corresponding to the synchronizing-pulse components of the applied composite video signals, and these output pulses drive the line-frequency and field-frequency scanning systems. The other plate electrode is utilized to develop an automatic gain control (AGC) potential which is then applied in a conventional manner to one or more of the early receiving stages. In order to insure the establishment of synchronizing-pulse output at the first plate electrode whenever the automatic gain control system goes into effect to limit further growth of the signal, the two apertures in the target electrode are disposed in overlapping alignment in a direction parallel to the plane of the sheet-like electron beam. In addition to providing noise-immune synchronizing-signal separation and automatic gain control generation in a single tube, this system has the important advantage of automatically establishing the correct synchronizing-signal clipping level for all receiver-input signal levels, with the result that incorrect synchronizing-pulse clipping which might otherwise be caused by drift or misadjustment of the automatic gain control circuits is effectively precluded.

In the copending application of John G. Spracklen, Serial No. 246,768, filed September 15, 1951, for "Television Receiver," and assigned to the present assignee, there are disclosed and claimed a still further novel tube and system for combining certain features embodied in the systems of the aforementioned Adler applications. To achieve this objective, the requirement for a magnetic deflection field is obviated by modifying the tube construction and external circuit connections to provide phase detection by means of a gating action. To this end, the single synchronizing-signal output plate of the last mentioned Adler tube is replaced by at least a pair of phase-detector plate electrodes symmetrically positioned behind the sync clipping aperture. A balanced comparison signal is applied between the two phase-detector plates from the line-frequency scanning system of the receiver. When the desired condition of phase synchronism exists, the phase-detector plates are maintained at equal potentials; however, upon deviation from synchronism, a balanced control potential indicative of the magnitude and direction of the deviation is developed. In accordance with a preferred embodiment, this system is employed in conjunction with a deflection tube oscillator, and the phase-detector plate electrodes are direct-coupled to the deflection electrodes of the oscillator tube to effect automatic frequency control.

While the tubes and systems described and claimed in the aforementioned copending applications are operative and afford numerous advantages over conventional synchronizing and automatic gain control systems, it has been found that certain difficulties of a practical nature may be encountered. In accordance with established principles underlying the design and operation of synchronizing systems employing automatic frequency control arrangements, the flyback or retrace interval of the scanning cycle should be centered in time with respect to the incoming synchronizing pulses. However, with a system of the type described in the first-mentioned Adler applications and/or the above-identified Spracklen application, flyback or retrace is initiated at a time corresponding to the center or median time of the incoming synchronizing pulse. Consequently, the use of these systems entails the appearance of a phasing error which is manifested as a lateral shift in the reproduced image at the receiver. In practice, it has been found that the amount of decentering thus encountered may amount to as much as five or ten percent of the total picture width.

It is therefore an important object of the present invention to provide a new and improved synchronizing system for use in a television receiver, of the type disclosed and claimed in the first-mentioned Adler applications and/or the above-identified Spracklen application.

It is a more specific object of the invention to provide such a new and improved system in which undesirable decentering of the reproduced image at the screen of the image-reproducing device is substantially avoided, and to accomplish this objective by means of a simple and economical modification of the tube and/or system.

In order to compensate undesirable picture decentering, a phasing correction of appropriate magnitude and sense is accomplished, in accordance with the invention, by the introduction of a phase shifting means, intermediate the phase-detector and the input circuit to the receiver scanning apparatus. The desired objective may be achieved by introducing an asymmetry in the output system of the oscillator or power section of the tube, or by connecting a phase-shifting circuit between the phase-detector output electrodes and the deflectors in the oscillator or power section.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Figure 6 is a graphical representation useful in understanding the operation of the invention;

Figure 9 is a cross-sectional view, similar to the view of Figure 7, of a further modification of the invention;

Figure 10 is a cross-sectional view taken along the line 10—10 of Figure 9;

Figure 11 is a view similar to that of Figure 10 of a modified construction;

Throughout the specification and the appended claims, the term "composite television signal" is employed to describe the received modulated carrier signal, while the term "composite video signal" is employed to denote the varying unidirectional signal after detection. The term "direct-coupling" is descriptive of a circuit coupling capable of transmitting direct or unidirectional voltages, and a "direct connection" is a direct-coupling of substantially zero impedance.

Figure 1:
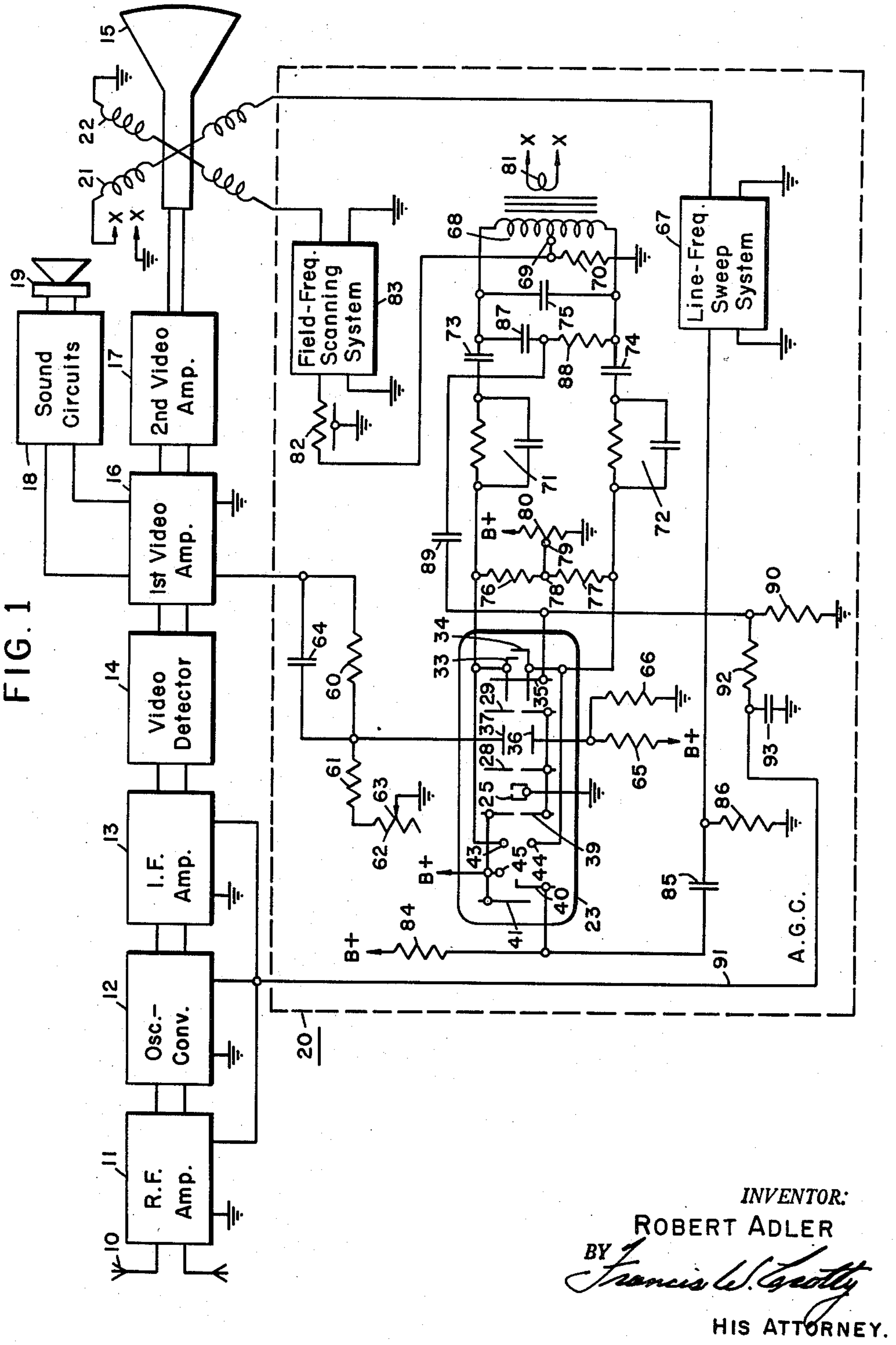
Figure 1 is a schematic circuit diagram of a television receiver embodying the present invention.

In the television receiver of Figure 1, incoming composite television signals are received by an antenna 10 and impressed on a radio frequency amplifier 11. The amplified composite television signals from radio-frequency amplifier 11 are supplied to an oscillator-converter 12, and the intermediate-frequency output signals from oscillator-converter 12 are impressed on an intermediate-frequency amplifier 13. The amplified intermediate-frequency composite television signals are demodulated by a video detector 14, and the video-signal components of the resulting composite video signals are impressed on the input circuit of an image-reproducing device 15, such as a cathode-ray tube, after amplification by first and second video amplifiers 16 and 17. Intercarrier sound signals developed in the output circuit of first video amplifier 16 are impressed on suitable sound circuits 18, which may comprise a limiter-discriminator and audio and power amplifier stages, and the amplified audio signals are impressed on a loudspeaker 19 or other sound-reproducing device.

Composite video signals from first video amplifier 16 are supplied to a synchronizing and automatic gain control system 20 embodying the present invention, and suitable line-frequency and field-frequency scanning signals are impressed on appropriate line-frequency and field-frequency deflection coils 21 and 22 associated with image-reproducing device 15.

The basic construction and operation of synchronizing and automatic gain control system 20 are specifically described in the above-identified Spracklen application. This system is built around a special purpose electron tube 23 of novel construction which combines the several functions of noise-immune synchronizing-signal separation, automatic-frequency-control phase-detection, generation of line-frequency oscillations, frequency control of the line-frequency oscillations, and automatic gain control generation. To facilitate the following description of the construction and operation of the receiver of Figure 1, reference is now made to Figures 2–5.

Figure 2:
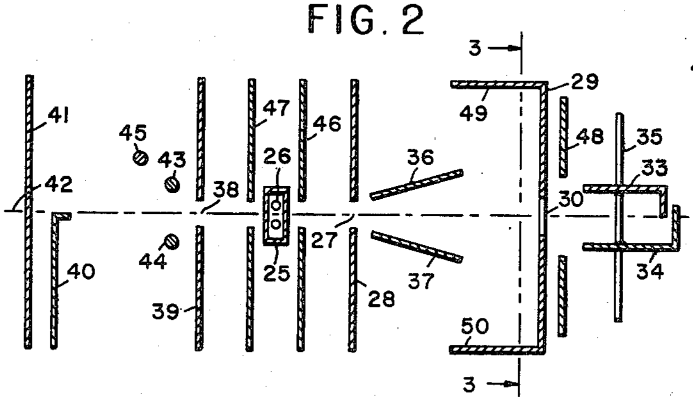
Figure 2 is a cross-sectional view of a special purpose electron tube constructed in accordance with the invention and adapted to be used in the receiver of Figure 1.

In Figure 2, which is a cross-sectional view of special purpose electron tube 23, two separate sheet-like electron beams of substantially rectangular cross-section are projected from opposite electron-emissive surfaces of a common elongated cathode 25 which is provided with an indirect heater element 26. In the right-hand section of the tube, space electrons originating at cathode 25 are projected through a slot 27 in an accelerating electrode 28 toward a target electrode or intercepting anode 29 which is provided with a pair of rectangular apertures or slots 30 and 31, best visualized from the view of Figure 3. Preferably, slots 30 and 31 are arranged in overlapping alignment in a direction parallel to cathode 25, and slot 31 may be provided with a lateral extension 32 for a purpose to be hereinafter described. A pair of output electrodes 33 and 34 are provided for collectively receiving space electrons which pass through slot 30, and an additional plate or output electrode 35 is provided for receiving space electrons which pass through slot 31. Output electrodes 33 and 34 are preferably constructed as "controllector" electrodes each having a deflection-control portion and a collector portion and adapted to be biased at equal positive operating voltages in the manner described and claimed in the copending application of Robert Adler, Serial No. 263,737, filed December 28, 1951, for "Electron-Discharge Device," and assigned to the present assignee. However, output electrodes 33 and 34 may be formed in any other desired manner, for example as a pair of simple transverse collecting plates such as those described in the above-identified Spracklen application, without departing from the spirit of the invention. A deflection-control system, illustrated as a pair of electrostatic-deflection electrodes or plates 36 and 37, is provided between accelerating electrode 28 and target electrode 29. Preferably the tube is so constructed and operated that the thickness of the beam at the plane of target electrode 29 is less than the width of slot 30.

In the left-hand section of the tube, electrons originating at cathode 25 are projected through a slot 38 in an accelerating electrode 39 toward an output system comprising a pair of anodes 40 and 41 respectively having active portions on opposite sides of the tube axis or undeflected path 42 of this second beam. A pair of electrostatic-deflection electrodes 43 and 44 are provided between slot 38 and anodes 40 and 41.

Those elements thus far described constitute the essential elements of a special purpose electron tube suitable for use in the synchronizing and AGC system 20 of the receiver of Figure 1. However, refinements of this electrode system may be made in accordance with well known practices in the art. Thus, for example, focusing electrodes 46 and 47, each having a slot narrower than the emissive surfaces of cathode 25, may be interposed between the cathode and either or both of the accelerating electrodes 28 and 39 and maintained at or near cathode potential to restrict electron emission to a narrow central portion of the respective emissive surfaces. Moreover, it may be advantageous to include one or more suppressor electrodes, such as electrode 48, between intercepting anode 29 and electrodes 33, 34 and 35, and to form target electrode 29 with flanges 49 and 50 directed toward the electron gun comprising cathode 25 and accelerating electrode 28, for the purpose of avoiding spurious effects attributable to secondary electron emission. Moreover, the particular construction of deflection-control systems 36, 37 and 43, 44 may be varied without departing from the scope of the present invention; for example, one or more of the deflection electrodes may be replaced by plural electrodes biased at different potentials, such as cathode potential and the D. C. supply voltage of the associated apparatus with which the tube is employed. Preferably, however, deflection electrodes 43 and 44 in the left-hand section of the tube are constructed as simple parallel rods or wires to minimize the intercepting area presented thereby to electrons originating at cathode 25. Still further, either or both of the sheet-like electron beams may be split into two or more beams subjected to a common transverse deflection field without departing from the spirit of the invention.

The electrode system is mounted within a suitable envelope (not shown) which may then be evacuated, gettered and based in accordance with well known procedures in the art. The entire structure may conveniently be included in a miniature glass envelope, a number of the electrode connections being made internally of the envelope in a manner to be made apparent for the purpose of minimizing the number of external circuit connections.

That portion of the tube structure thus far described is substantially identical with that disclosed in certain of the aforementioned copending applications. In accordance with the present invention, however, an auxiliary deflecting electrode 45, laterally spaced from tube axis 42, is provided between electrostatic-deflection electrodes 43 and 44 and anodes 40 and 41 for a purpose to be hereinafter described.

In operation, deflection plates 36 and 37 are biased to direct the electron beam in the right-hand section of the tube to an electron-impervious portion of target electrode 29, for example, to a solid portion of electrode 29 on the side of aperture 30 nearer deflection plate 36. When an input signal of positive polarity is applied to deflection plate 37, or alternatively when an input signal of negative polarity is applied to deflection plate 36, the beam is deflected at least partially into slots 30 and 31 whenever the input signal exceeds a predetermined amplitude level. During such intervals, current is permitted to flow in the output circuits associated with electrodes 33, 34 and 35, provided these electrodes are maintained at a proper potential to receive electrons, while during other intervals no such current flow can occur. Moreover, when the input signal exceeds a predetermined higher amplitude, the beam is deflected beyond slot 30 of intercepting electrode 29, and current flow to output electrodes 33 and 34 is again interrupted. At still greater input-signal amplitudes, the current flowing to output electrode 35 is first diminished as the beam is deflected into extension 32 of slot 31 and then extinguished as the beam sweeps beyond extension 32.

Figure 4:
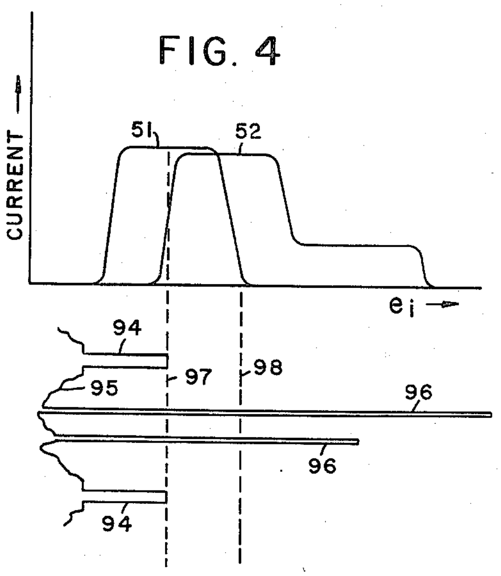
Figures 4 and 5 are graphical representations of certain operating characteristics of the tube shown in Figures 2 and 3.
Figure 5:
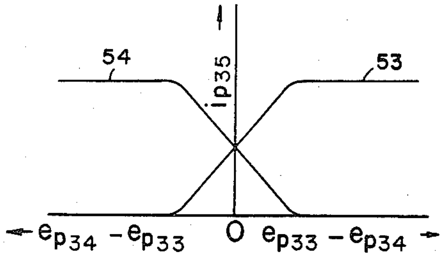

The transfer characteristics of the input deflection-control system 36, 37 with respect to the output system comprising electrodes 33 and 34 and with respect to output electrode 35 are represented by curves 51 and 52 respectively of Figure 4. Curve 51 represents the total current ($i_{p33}+i_{p34}$) flowing to controllector electrodes 33 and 34 as a function of the input voltage $e_i$ applied to deflection-control system 36, 37. Curve 52 shows the current $i_{p35}$ to output electrode 35 as a function of the input voltage $e_i$. The magnitudes and shapes of curves 51 and 52 are determined by the geometry of slots 30 and 31; the particular operating characteristics illustrated in Figure 4 are those obtained for a specific embodiment and are not intended to be construed as representing required relative or absolute magnitudes or shapes.

Output electrodes 33 and 34, which each comprise electrically connected control and collector portions and are therefore termed "controllector" electrodes, are disposed in effectively symmetrical relation with respect to the tube axis 42 passing through the center of slot 30 and, in operation, are preferably biased to equal positive unidirectional operating potentials. The collector portions conjointly define a collector system for collectively receiving substantially all electrons projected through slot 30, and the control portions serve as a deflection-control system responsive to applied signals for controlling the space current distribution between the collector portions. The control characteristics of controllector electrodes 33 and 34 are shown qualitatively in Figure 5, in which curve 53 represents the current $i_{p33}$ to electrode 33 and curve 54 the current $i_{p34}$ to electrode 34 as functions of the potential difference $e_{p33}-e_{p34}$ between the two controllector electrodes. As described in the last-mentioned copending Adler application, it has been found that the current distribution between controllector electrodes 33 and 34 may be made substantially independent of the position at which the beam enters slot 30 of target electrode 29. This desirable condition may be obtained over a broad range of positive bias potentials for controllector electrodes 33 and 34, as for example between one-fifth and one-third of the voltage applied to target electrode 29. When so operated, target electrode 29 and controllector electrodes 33 and 34 form an electrostatic lens for focusing the beam, whenever it passes through slot 30, to converge on the collector system at a location substantially independent of the input signal applied between deflection-control electrodes 36 and 37. Thus, in practice, it has been found that the operating characteristics of Figure 5 remain substantially unchanged throughout a fairly large range of positive bias potentials for controllector electrodes 33 and 34. Curves 53 and 54 intersect symmetrically, for an effectively symmetrical physical construction, and the current is divided equally between electrodes 33 and 34 when their potentials are equal. Secondary electrons originating at controllector electrodes 33 and 34 are effectively trapped in the enclosed region between these electrodes.

The left-hand portion of the structure of Figure 2 constitutes a conventional deflection-control electrode system, modified in accordance with the present invention by the addition of auxiliary deflecting electrode 45 for a purpose to be hereinafter described. The electron beam projected through slot 38 of accelerating-electrode 39 is directed either to anode 40 or to anode 41 in accordance with the instantaneous potential difference between electrostatic-deflection electrodes 43 and 44. If a sinusoidal signal wave is applied between deflection electrodes 43 and 44, the beam is caused cyclically to sweep back and forth transversely across axis 42 and is thereby switched back and forth between anodes 40 and 41. Consequently, since full beam current is switched from one anode to the other in a relatively small fraction of a cycle, oppositely phased square-wave output signals are produced in load circuits respectively associated with anodes 40 and 41; in the preferred embodiment of the invention, only one square-wave output signal is required, and either anode 40 or anode 41 is employed to develop the output signal while the other is directly connected to accelerating electrode 39. It is preferred that anode 40 be employed as the output anode in order to avoid difficulties arising from secondary electron emission.

If a positive unidirectional operating potential is applied to auxiliary deflecting electrode 45, as for example by directly connecting electrode 45 to accelerating electrode 39, the mean path of the beam projected through slot 38 and controlled by the signal wave applied between deflection electrodes 43 and 44 is diverted upwardly as viewed in Figure 2 from the tube axis 42. Under this operating condition, the duty cycles of anodes 40 and 41 are modified, anode 40 receiving less beam current and anode 41 a greater amount of beam current than in the case of symmetrical operation. Consequently, the output signal developed in the load circuit associated with anode 40 is a rectangular wave with asymmetrical positive and negative portions. In practice, the duty cycles of anodes 40 and 41 are determined by the size, position, and operating potential of auxiliary deflecting electrode 45.

Electron-discharge device 23 of the receiver of Figure 1 is constructed in the manner shown and described in connection with Figures 2–5. Composite video signals from first video amplifier 16 are supplied to deflection plate 37, hereinafter termed the active deflector, in the right-hand section of device 23 by means of a voltage-divider network comprising resistors 60 and 61 connected in series with a potentiometer 62 having a grounded movable tap 63, deflection plate 37 being connected to the junction between resistors 60 and 61. A condenser 64 is connected in parallel with resistor 60. Cathode 25 of device 23 is connected to ground. Accelerating electrodes 28 and 39, target electrode 29, second anode 41, and auxiliary deflecting electrode 45 are connected together (preferably internally of the envelope) and to a suitable source of positive unidirectional operating potential conventionally designated B+. Deflection plate 36 is connected to a tap on a voltage divider comprising resistors 65 and 66 connected between B+ and ground.

Synchronizing system 20 also comprises a line-frequency sweep system 67, which may include a discharge tube and a power output stage, for impressing suitable deflection currents on line-frequency deflection coil 21 associated with image-reproducing device 15. Controllector electrodes 33 and 34 of device 23 are respectively coupled to opposite terminals of a coil 68, having a center tap 69 which is returned to ground through a resistor 70, by means of anti-hunt networks comprising shunt-connected resistor-condenser combinations 71 and 72, and condensers 73 and 74. A tuning condenser 75 is connected in parallel with coil 68, and a conductive load impedance, such as a pair of resistors 76 and 77, is connected between electrodes 33 and 34, the junction 78 between resistors 76 and 77 being connected to a suitable positive bias potential source, as by connection to a tap 79 of a voltage divider 80 connected between B+ and ground. Coil 68 is energized by a feedback coil 81 which is preferably connected in series between line-frequency deflection coil 21 and ground, as indicated by the terminal designations X—X. Center tap 69 of coil 68 is also coupled through an integrator 82 to a field-frequency scanning system 83 which provides suitable deflection currents to field-frequency deflection coil 22 associated with image-reproducing device 15.

Controllector electrodes 33 and 34 are directly connected to electrostatic-deflection electrodes 43 and 44 respectively in the left-hand section of device 23, and anode 40 is connected to B+ through a load resistor 84 and to line-frequency sweep system 67 through a differentiating network comprising a series condenser 85 and a shunt resistor 86.

A keying signal is supplied to plate electrode 35 by means of a coupling condenser 89 from the junction between a condenser 87 and a resistor 88 connected in series across the terminals of coil 68, and a resistor 90 is connected between plate electrode 35 and ground. Plate electrode 35 is coupled to the AGC lead 91 by an integrating network comprising a series resistor 92 and a shunt condenser 93, and AGC lead 91 is connected to one or more of the receiving circuits comprising radio-frequency amplifier 11, oscillator-converter 12, and intermediate-frequency amplifier 13.

With the exception of auxiliary deflecting electrode 45 in the left-hand or "power" section of device 23, the construction and operation of synchronizing and automatic gain control system 20 are substantially identical with those disclosed and claimed in certain of the above-identified copending applications. Positive-polarity composite video signals, including the direct-voltage components, from the output circuit of first video amplifier 16 are applied to active deflector 37 by means of the voltage-divider network comprising resistors 60, 61 and 62 and condenser 64. Deflection plates 36 and 37 are so biased that the beam projected through aperture 27 of accelerating electrode 28 is normally directed to an electron-impervious portion of target electrode 29, as for instance, to a solid portion of target electrode 29 on the side of apertures 30 and 31 nearer deflection plate 36, or to the left of aperture 30 in the view of Figure 3. Application of the positive-polarity composite video signals to active deflector 37 causes a transverse deflection of the beam in accordance with the instantaneous signal amplitude. The operating potentials for the various electrodes are so adjusted that different longitudinal portions of the beam are respectively deflected entirely into aperture 30 and partially into aperture 31 of intercepting anode 29 in response to the synchronizing-signal components of the applied composite video signal; the beam is entirely intercepted by target electrode 29 and/or deflection plate 36 during video-signal intervals. As a consequence, beam current is only permitted to flow to electrodes 33, 34 and 35 during synchronizing-pulse intervals.

The left-hand section of device 23 serves as a line-frequency oscillator in the line-frequency scanning system. Oppositely phased sinusoidal signals are applied to deflection electrodes 43 and 44 by means of coil 68 and condenser 75 which are tuned to the line-scanning frequency to operate as a ringing circuit or filter and which are excited by means of coil 81 inserted in series with the line-frequency deflection coil 21. Consequently, the beam in the left-hand section of device 23 is caused to sweep back and forth between anodes 40 and 41, so that a rectangular-wave output voltage is developed across resistor 84. This output voltage is differentiated by means of condenser 85 and resistor 86, and the resulting positive-polarity or negative-polarity pulses are employed to trigger line-frequency sweep system 67, depending on the construction of that sweep system.

At the same time, the same oppositely phased sinusoidal voltage waves applied to deflection electrodes 43 and 44 are impressed on controllector electrodes 33 and 34, respectively, in the right-hand section of device 23. As previously explained current flow to controllector electrodes 33 and 34 is restricted to synchronizing-pulse intervals by virtue of the geometry of target electrode 29. The current distribution between electrodes 33 and 34 is dependent upon the instantaneous potential difference between these electrodes during the synchronizing-pulse intervals.

The oppositely phased sinusoidal signals developed across coil 68 and condenser 75 serve as comparison signals in a balanced phase-detector. If the comparison signals are properly phased with respect to the incoming line-frequency synchronizing-signal pulses, the instantaneous potentials of controllector electrodes 33 and 34 are equal at the time of the arrival of each synchronizing pulse, and the space current passing through aperture 30 is equally divided between electrodes 33 and 34, with the result that no unidirectional control potential difference is developed between the controllector electrodes. On the other hand, if the comparison signals and the incoming line-frequency synchronizing-signal pulses are not in proper phase synchronism, the instantaneous potentials of the two controllector electrodes 33 and 34 at the time of arrival of each line-frequency synchronizing-signal pulse are different, so that the beam currents collected by electrodes 33 and 34 are unequal and a unidirectional control signal is developed between the controllector electrodes. Since controllector electrodes 33 and 34 are directly connected to deflection electrodes 43 and 44 respectively in the left-hand section of device 23, the beam in the left-hand section is accelerated or retarded in its progress from anode 40 to anode 41 and back in response to the unidirectional control signal. As a result, the positive and negative half-cycles of the output voltage wave developed across resistor 84 are altered in time duration in accordance with the unidirectional control potential difference between electrodes 33 and 34. The quasi-square wave thus developed is differentiated to provide triggering pulses for line-frequency sweep system 67. Since the triggering pulses are derived by differentiating the leading or trailing edges of the output quasi-square wave, and since the timing of these leading and trailing edges is varied in accordance with the developed AFC potential, phase synchronism of the line-frequency sweep system with the incoming line-synchronizing pulses is assured.

In order to obtain the desired automatic-frequency-control (AFC) action, it is essential that a condition in which the comparison signals lag the incoming synchronizing-signal pulses result in an increase in the frequency of the local oscillator comprising the left-hand section of device 23, line-frequency sweep system 67, and feedback circuit 81, 68. This operation is insured by the common direct connections for both the sinusoidal comparison signals and the unidirectional AFC potential from controllector electrodes 33 and 34 to deflection electrodes 43 and 44 respectively. It is possible, for a given construction of sweep system 67, that the system may fail to oscillate altogether due to incorrect phasing of the comparison signals and the triggering pulses for the line-frequency sweep system; this condition may be corrected by merely reversing the terminal connections of feedback coil 81 or of coil 68, or, if separate leads are provided for anodes 40 and 41, by reversing the circuit connections of these two anodes. Proper pull-in action is automatically insured for any condition for which oscillation is obtained.

To obtain field-frequency synchronization, the output currents to controllector electrodes 33 and 34 are effectively combined by means of a resistor 70 connected in the common ground return for controllector electrodes 33 and 34. The combined output appearing across resistor 70 is integrated by integrator 82 to provide a control signal for field-frequency scanning system 83. The beam current through aperture 30, representing the clipped sync pulses, is first used in its entirety to provide a balanced line-frequency control potential, and then again in its entirely to synchronize the field scansion. The use of an output load impedance connected in a common return circuit for the phase-detector electrodes for deriving field-frequency driving pulses is specifically described and claimed in the copending application of Robert Adler, Serial No. 260,221, filed December 6, 1951, now Patent No. 2,740,002, for "Synchronizing Control Apparatus," and assigned to the present assignee. It is of course also possible to employ a separate plate electrode for the sole purpose of developing field-frequency synchronizing-signal pulses for application to the field-frequency scanning system, as described in the above-identified copending Spracklen application.

Plate electrode 35 develops a unidirectional control potential indicative of the amplitude of the composite video signals for application to the receiving circuits preceding the video detector to effect automatic gain control of the receiver. The sinusoidal line-frequency voltage developed across coil 68 and condenser 75 is impressed on the series combination of condenser 87 and resistor 88, and the phase-shifted sinusoidal voltage wave appearing at the junction of resistor 88 and condenser 87 is applied to plate electrode 35 as a keying or energizing signal. Condenser 87 and resistor 88 are proportioned to provide a phase shift of the keying signal with respect to the voltage across coil 68 which is suitable to insure peak energization of plate electrode 35 during the line-synchronizing pulse intervals. This keying signal performs a gating function, permitting plate electrode 35 to accept space electrons passing through aperture 31 of intercepting anode 29 only during those intervals when plate electrode 35 is instantaneously positive. Consequently, a potential is developed across resistor 90 in response to time coincidence of the synchronizing-signal components of the composite video signals and the positive-polarity keying signal applied to plate electrode 35. This potential is integrated by resistor 92 and condenser 93 to provide a negative-polarity unidirectional control potential for application to the AGC lead 91.

Figure 3:
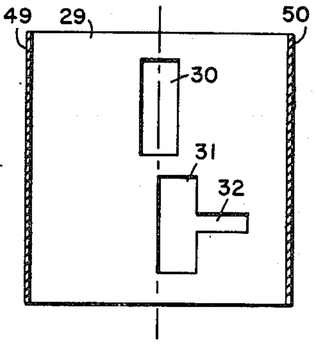
Figure 3 is a cross-sectional view taken along the line 3—3 of Figure 2.

Certain important advantages of the system may best be understood by consideration of Figures 2–4. Since aperture 30 in intercepting anode 29 has definite fixed boundaries, it is apparent that deflection of the beam beyond aperture 30 results in interception thereof by anode 29. Consequently, extraneous noise pulses, which are generally of much larger amplitude than any desired component of the composite video signals, are not translated to controllector electrodes 33 and 34, and loss of synchronization due to extraneous impulse noise is substantially precluded. This operation is apparent from the operating characteristic 51 of Figure 4. When composite video signals comprising synchronizing-pulse components 94 and video-signal components 95 are impressed on active deflection plate 37, extraneous noise pulses 96, which are of greater peak amplitude than the synchronizing-pulse components by an amount exceeding the voltage represented by the spacing between vertical lines 97 and 98, result in deflection of the beam beyond aperture 30; consequently, these noise pulses are not translated to the output circuits associated with controllector electrodes 33 and 34, and substantial noise immunity is achieved. Aperture 30 is preferably of constant length in a direction parallel to cathode 25, in order to provide output current pulses of constant amplitude for application to scanning system 83 and to insure proper AFC action in spite of such rapid fluctuations in the amplitude of the synchronizing pulses as are occasionally encountered.

The operation of the gated automatic gain control system may perhaps best be understood by a consideration of operating characteristic 52 of Figure 4. Space electrons are permitted to pass to plate electrode 35 only when the electron beam is laterally deflected at least partially into aperture 31, and then only if plate electrode 35 is instantaneously maintained at a positive potential by the keying signal applied to that electrode. In an equilibrium condition, the deflection-control system is so biased that the peaks of the synchronizing-signal pulses are impressed on the rising portion of characteristic 52, as indicated by vertical line 97. When the signal amplitude increases, the peaks of the synchronizing pulses 94 instantaneously extend farther to the right, and the space current to plate electrode 35 is increased. This results in an increase in the negative unidirectional control potential applied to the receiving circuits 11, 12 and 13, thus reducing the gain of these circuits and thereby restoring the amplitude of the input signal applied to active deflection plate 37 to the equilibrium value indicated in the drawing. On the other hand, if the signal amplitude instantaneously decreases, the negative gain-control potential decreases and the gain of the receiving circuits is increased to restore equilibrium. Noise pulses 96 occurring during the middle part of any video-signal interval have substantially no effect on the automatic gain control potential since plate electrode 35 is maintained at or below cathode potential during approximately that half of each line-frequency operating cycle by the keying signal applied from sweep system 67. Moreover, even such noise pulses as may occur during synchronizing-pulse intervals or at other times when plate electrode 35 is positive relative to cathode 25, if of sufficiently great amplitude, are prevented from contributing to the automatic gain control potential by virtue of the finite boundaries of aperture 31. Consequently, even greater noise immunity is obtained with the present automatic gain control system than with conventional gated automatic gain control arrangements employing grid-controlled tubes for AGC generation. Extension 32 of slot 31 is provided for the purpose of avoiding paralysis of the AGC system as described in application Serial No. 242,509, now Patent 2,717,972.

Since it is desirable for the synchronizing current pulses developed at controllector electrodes 33 and 34 to be of constant amplitude, it is preferred that the peaks of the synchronizing-pulse components 94 be impressed on characteristic 51 at a constant-current region of that characteristic; in other words, the synchronizing-pulse components of the applied composite video signals should cause deflection of the upper portion of the beam entirely into aperture 30. At the same time, because of the automatic gain control action, the peaks of the synchronizing-pulse components 94 are normally superimposed on a sloping portion of characteristic 52; in other words, the synchronizing-pulse components of the applied composite video signals cause deflection of the lower portion of the beam only partially into aperture 31. By disposing apertures 30 and 31 in overlapping or staggered alignment in a direction parallel to cathode 25, as illustrated in Figure 3, it is insured that whenever the automatic gain control action establishes the equilibrium condition illustrated by the graphical representation of Figure 4, synchronizing current pulses of constant amplitude are developed at controllector electrodes 33 and 34; in other words, the clipping level of the synchronizing-signal separator is automatically adjusted in spite of varying signal strengths at the receiver input. The direct voltage-to-alternating voltage transmission ratio of the voltage-divider network comprising resistors 60, 61 and 62 and condenser 64 may be adjusted by means of variable tap 63 to a value of less than unity to preclude receiver paralysis under abnormal operating conditions, in the manner described and claimed in the copending application of John G. Spracklen, Serial No. 259,063, filed November 30, 1951, now Patent No. 2,684,403, for "Television Receiver" and assigned to the present assignee.

In the absence of auxiliary deflecting electrode 45, it has been found that the reproduced image at the screen of image-reproducing device 15 is laterally displaced from its normal central position. This decentering phenomenon is attributable to a picture-phasing error which arises in a manner readily understood by a consideration of the graphical representation of Figure 6 in which several waveforms are plotted for the condition in which coil 68 and condenser 75 are tuned to the repetition frequency of the line-synchronizing pulses. Waveform A of Figure 6 represents the line-frequency synchronizing-pulse components of the positive-polarity composite video signals applied to active deflector 37, while waveform B represents the potential difference between controllector electrodes 33 and 34 due to the applied sinusoidal AFC comparison signal. As is apparent from the foregoing discussion, the automatic frequency control action is effective to shift the comparison wave B until the synchronizing-pulse components of waveform A are substantially centered with respect to the crossover points of comparison wave B; in other words, the median times of the synchronizing pulses coincide with the instants of equal instantaneous potential for controllector electrodes 33 and 34 for synchronous operation, as indicated by the vertical dotted lines 100.

By virtue of the direct electrical connections between controllector electrodes 33 and 34 and deflection electrodes 43 and 44, comparison wave B is also applied between deflectors 43 and 44, and, in the absence of auxiliary deflecting electrode 45, the beam in the left-hand section of device 23 is cyclically swept back and forth between anodes 40 and 41, the mean path of the beam coinciding with the tube axis 42 (Figure 2). As a consequence, a square-wave output signal is developed across resistor 84, and this square-wave output voltage is differentiated by means of condenser 85 and resistor 86 to provide trigger pulses of alternately positive and negative polarity for application to line frequency sweep system 67. If, as in the conventional case, the line-frequency sweep system comprises a discharge tube, input pulses of positive polarity only are effective to initiate flyback. Since the positive-polarity trigger pulses coincide with the corresponding wavefront of the output voltage developed across resistor 84, and since, for a symmetrical construction and operation, these trailing wavefronts coincide in time with the median time of the synchronizing signal pulse components, flyback is initiated at a time corresponding to the center of the incoming synchronizing pulse, as indicated by the resulting scanning current depicted by dotted curve 101 of waveform F. Actually, the system seeks a somewhat more complicated state of equilibrium, but a more detailed analysis is deemed unnecessary; the important consideration is the fact that flyback is initiated at a time corresponding to the median time of the incoming line-synchronizing pulse.

On the other hand, it is well understood that in accordance with well established principles of automatic frequency control synchronization under presently adopted governmental standards, flyback should be initiated at an instant corresponding to or, preferably, slightly preceding the leading edge of the incoming synchronizing pulse in order to obtain proper picture centering.

By providing auxiliary deflecting electrode 45 between deflectors 43 and 44 and passive anode 41, and by operating auxiliary deflector 45 at a constant positive potential in the manner indicated, the duty cycles of anodes 40 and 41 are modified to provide a rectangular-wave output voltage across resistor 84. Auxiliary deflector 45 causes the mean path of the beam in the left-hand section of device 23 to be diverted from the tube axis 42 (Figure 2), so that the transitions of the beam between anodes 40 and 41 occur at instants corresponding to the intersection of waveform B with horizontal line 102 displaced from the zero-reference axis of waveform B by a distance dependent upon the size, location and operating potential of deflector 45 and corresponding to the deviation of the mean path of the beam from the tube axis at the plane of the output system. The beam current to output anode 40 is represented by waveform C, and the corresponding voltage developed across output resistor 84 is indicated by waveform D. The input voltage applied to line-frequency sweep system 67, corresponding to the differentiated output voltage D developed across resistor 84, comprises pulses of alternately positive and negative polarity as shown in waveform E, and the positive-polarity pulses are effective to initiate flyback at an instant corresponding to or slightly preceding the leading edge of the line-frequency synchronizing pulse. The scanning current impressed on deflection coil 21 by line-frequency sweep system 67 is graphically depicted by curve 103 of waveform F; since the fundamental-frequency component of the scanning current 103 is in phase with comparison wave B, oscillation of the system is sustained at a frequency determined by coil 68 and condenser 75.

Figure 7:
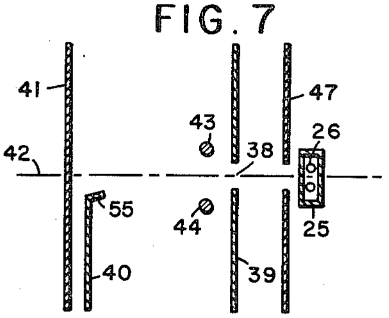
Figure 7 is a cross-sectional view, similar to a portion of the view of Figure 2, of another embodiment of the invention.

While the use of an auxiliary deflecting electrode results in a correction of the picture-phasing error and permits accurate centering of the reproduced image, it leads to complication of the tube structure. Equivalent results may be obtained without so complicating the tube structure in the manner indicated in Figure 7, which is a cross-sectional view, similar to the left-hand portion of Figure 2, of another embodiment of the invention. In Figure 7, the intercepting edge 55 of output anode 40 is laterally displaced from tube axis 42 in lieu of providing an auxiliary deflecting electrode. In the embodiment of Figure 7, therefore, the mean path of the beam is not caused to deviate from the tube axis 42 as in the embodiment of Figure 2; rather, the displacement of intercepting edge 55 from tube axis 42 in an opposite direction results in equivalent operation.

In a generic sense, it is apparent that in both the embodiments of Figures 2 and 7, the left-hand section of the special purpose tube comprises an electron gun for projecting a focused electron beam, means including a deflection-control system 43, 44 responsive to an applied alternating signal for sweeping the beam back and forth across a predetermined mean path, and a pair of anodes 40 and 41 having active portions on opposite sides of and asymmetrical with respect to that mean path. In the embodiment of Figure 2, the asymmetry is obtained by diverting the mean path of the beam from the tube axis, whereas in the embodiment of Figure 7, the mean path of the beam is allowed to proceed along the tube axis while the output system itself is asymmetrically positioned with respect thereto.

Figure 8:
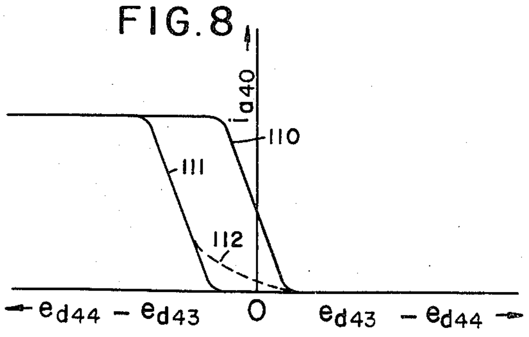
Figure 8 is a graphical representation of certain operating characteristics of systems embodying the invention.

While the desired correction of picture centering is simply and effectively accomplished by the minor modifications in tube structure described in connection with Figures 1–7, it is possible that oscillations in the system comprising filter 68, 75, the left-hand section of device 23, differentiating circuit 85, 86, line-frequency sweep system 67, and feedback coil 81 may fail to start, owing to the fact that the effective asymmetry of the output system with respect to the mean path of the beam in the power section may result in a condition of zero transconductance when the system is first set into operation. This condition may perhaps more readily be appreciated from the operating characteristics of Figure 8, in which the output current $i_{a40}$ to anode 40 is plotted as a function of the potential difference $e_{d43}-e_{d44}$ between the deflection electrodes 43 and 44. For a system in which the output anodes are symmetrically positioned with respect to the mean path of the beam, a transfer characteristic of the type represented by curve 110 is obtained. Thus, when the system is first set into operation, the beam is projected along the axis or mean path, and current is drawn by the output anode 40. Since the characteristic 110 has a substantial slope at a point where the potential difference between deflectors 43 and 44 is zero, starting of the oscillations in the system is assured.

However, in a system in which the output anodes are asymmetrically positioned with respect to the mean path of the beam, a characteristic of the type represented by the solid-line curve 111 is obtained. Under this condition, oscillations may fail to start due to the fact that characteristic 111 has a zero slope for the condition of zero potential difference between deflectors 43 and 44. In accordance with an important feature of the invention, the tube construction is further modified to provide a small but definite transconductance for the zero-potential-difference condition while retaining the effective asymmetry of the active portions of anodes 40 and 41 with respect to the mean path of the beam, thereby providing a transfer characteristic such as that indicated by the dotted curve 112. In this manner, starting of the oscillations under all conditions is assured.

In the embodiment of Figures 9 and 10, this objective is achieved in a tube structure of the type employing an auxiliary deflecting electrode 45 as described in connection with Figures 2 and 3 by providing an additional electrode 115, disposed on the opposite side of axis 42 from auxiliary deflector 45 and extending in a direction parallel to the cathode 25 for a distance less than the height of the electron beam. Electrode 115 may be formed as a narrow flange welded to accelerating electrode 39 and outwardly flared so that its effective controlling surface is in a common transverse plane with auxiliary deflector 45. In all other essential respects, the electrode system of Figures 9 and 10 is substantially identical with the left-hand section of the tube shown and described in connection with Figures 2 and 3; however, a modified output system has been illustrated in which anodes 40 and 41 are formed as simple plates disposed in a common plane with a suppressor electrode 116 disposed between them on the axis 42, in a manner well known in the art.

The operation of the device of Figures 9 and 10 is essentially the same as that of the device of Figure 2. When auxiliary deflecting electrode 45 is maintained at a constant positive unidirectional operating potential, as by connection to accelerating electrode 39, the mean path of the entire sheet-like electron beam projected through slot 38 and between deflectors 43 and 44 is diverted upwardly (as viewed in Figure 9) from axis 42, since auxiliary deflector 45 extends in a direction substantially parallel to cathode 25 for a distance at least equal to the full height of the beam. However, the mean path of a small portion of the sheet-like beam, corresponding to the length of additional electrode 115 in a direction parallel to cathode 25, is prevented from being so diverted from the tube axis 42 with the result that at least a small amount of beam current is directed to anode 40 even under the condition of zero potential difference between deflectors 43 and 44. In other words, the sheet beam is transversely distorted in such a way that the mean path of the major portion of the beam is diverted from the tube axis 42 toward the passive anode 41, but the mean path of a minor portion of the beam is not so diverted in order to provide the modified transfer characteristic 112 of Figure 8.

An equivalent construction is shown in Figure 11, in which auxiliary deflecting electrode 45 and additional electrode 115 are replaced by one or more flanges 117, formed generally in the manner of additional electrode 115, welded or otherwise directly connected to accelerating electrode 39 and having a total length in a direction parallel to cathode 25 which is somewhat less than the full height of the sheet beam. With this arrangement, the mean path of a minor portion of the beam opposite the gap between flanges 117 is permitted to proceed toward output system 40, 41 along the tube axis 42, while the mean path of the major portion of the beam is diverted from the tube axis 42 by the asymmetrical deflecting field established by flanges 117.

Figure 12:
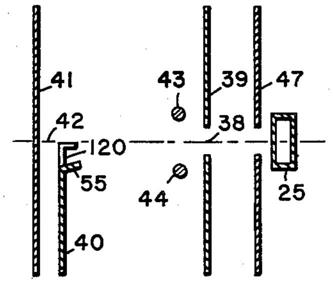
Figure 12 is a cross-sectional view similar to those of Figures 7 and 9 showing a further modification of the invention.
Figure 13:
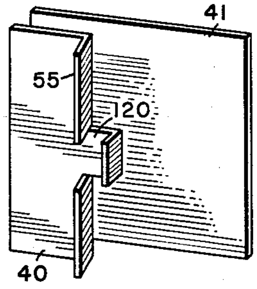
Figure 13 is a perspective view of the anode system of the tube of Figure 12.

The small additional transconductance required to insure starting may also be obtained by modifying a tube of the type represented in Figure 7 in the manner shown in the embodiment of Figure 12. To this end, output anode 40 is modified by providing a small projection 120 beyond the effective intercepting edge of the anode and extending to the tube axis 42. This construction is more clearly illustrated in the perspective view of Figure 13. In other words, the intercepting edge 55 of the output anode comprises a major portion which is spaced from the mean path 42 of the beam and a minor portion 120 which projects from the major portion to the mean path. Thus, when the receiver is first set into operation, it is insured that at least a small amount of beam current is intercepted by the edge of anode 40 to provide the required transconductance for insuring the starting of oscillations.

Figure 14:
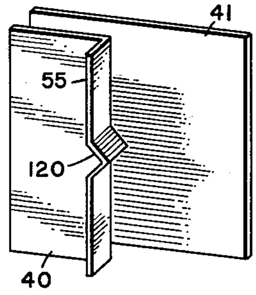
Figure 14 is a perspective view similar to that of Figure 13 of another modification.

In practice, it is preferred that minor portion 120 of the intercepting anode 40 be formed as a substantially triangular projection extending from the major portion 55 and having its apex substantially tangent to (in the sense of touching at a single point) the mean path of the beam, as shown in Figure 14, in order to avoid the formation of spurious output pulses corresponding to the transition of the beam across the intercepting edge of projection 120, and to provide improved trapping of secondary electrons.

Figure 15:
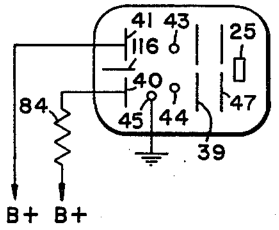
Figures 15–18 are fragmentary schematic views illustrating other embodiments of the invention.

The desired picture-phasing correction may also be accomplished in other manners without departing from the scope of the present invention. For example, in the fragmentary schematic view of Figure 15, the auxiliary deflecting electrode 45 is laterally spaced from the tube axis on the same side thereof as the output anode 40 and is connected to a point of fixed reference potential such as ground or cathode 25 instead of being connected to accelerating electrode 39.

Figure 16:
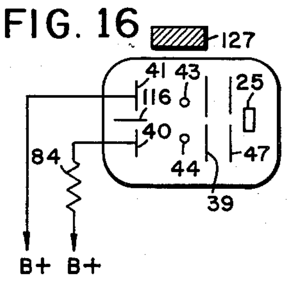

In Figure 16, a permanent magnet 127, which may be mounted either internally or externally of the tube envelope, is employed as the auxiliary deflection element to divert the mean path of the beam from the tube axis.

Figure 17:
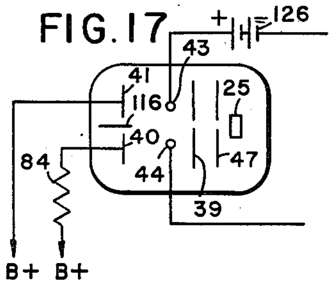

In all of the embodiments of the invention thus far described, the desired picture-phasing correction is obtained by means of a modified construction of the electrode system of the special purpose electron tube employed as the heart of the synchronizing and automatic gain control system. It is also possible, however, to obtain the desired compensation entirely by circuit means, without any modification of the tube structure as such. Thus, for example, in Figure 17, the desired effective asymmetry is accomplished by inserting a battery 126 in series with one of the deflection electrodes 43, 44 to divert the mean path of the beam from the tube axis.

Figures 18, 19:
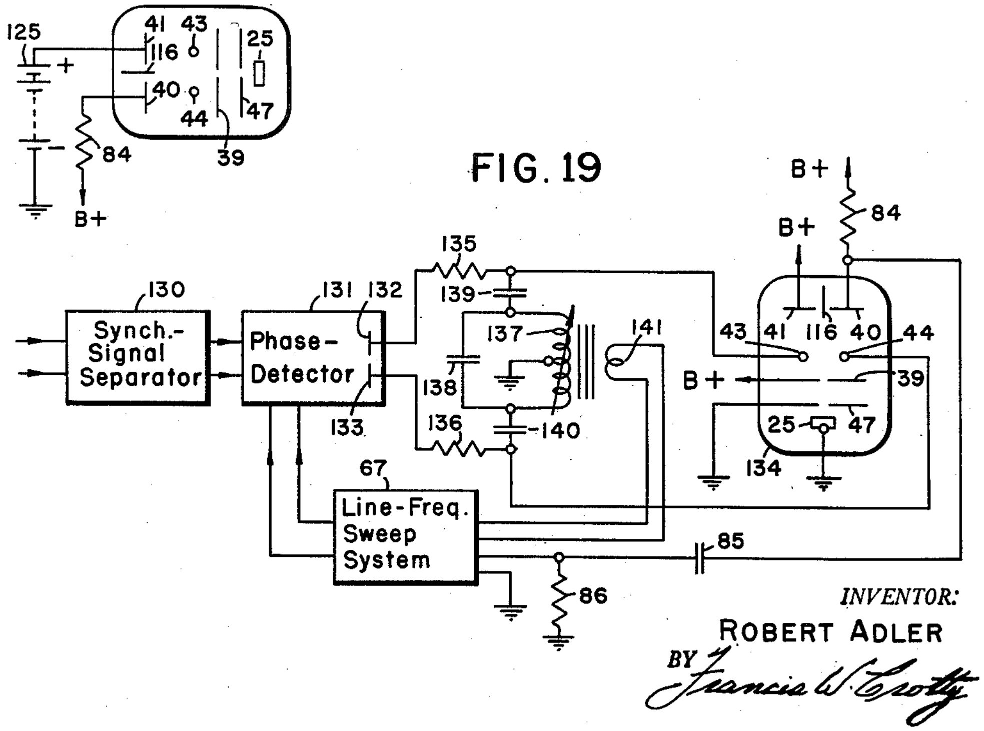
Figure 19 is a schematic circuit diagram of a portion of a television receiver comprising another embodiment of the invention.

In Figure 18, the mean path of the beam is diverted from the tube axis by operating the passive anode 41 at a greatly elevated positive potential with respect to B+, as by connecting anode 41 to an auxiliary high-voltage source such as a battery 125.

In the system of Figure 19, composite video signals are impressed on a synchronizing signal separator 130 of any suitable construction, and the line-frequency synchronizing-signal components are compared in phase with an output signal from line-frequency sweep system 67 in a balanced phase detector 131 having a pair of output electrodes 132 and 133. Output electrodes 132 and 133 are direct-coupled to deflection electrodes 43 and 44 respectively of an electron-discharge device 134 by means of a pair of resistors 135 and 136 respectively. The electron-discharge device 134 may be a conventional deflection-control tube in which the output anodes 40 and 41 have active portions which are symmetrical with respect to the mean path of the beam projected by the electron gun comprising cathode 25, focusing electrode 47 and accelerating electrode 39. Anode 40 is connected to B+ through output load resistor 84 and is coupled to line-frequency sweep system 67 through differentiating circuit 85, 86. In order to provide the desired picture-phasing correction, a parallel-resonant circuit comprising a coil 137 and a condenser 138 is coupled between deflection electrodes 43 and 44 by means of coupling condensers 139 and 140. Coil 137 and condenser 138 function as a passive oscillatory circuit or ringing circuit which is energized inductively by means of a coil 141 driven by line-frequency sweep system 67. Coil 137 is provided with a grounded center tap and, in order to provide a convenient control over the magnitude and sense of the phasing correction, means such as a tuning slug is provided for varying the inductance of coil 137 in a manner well known in the art.

In operation, the line-frequency pulse components of the detected composite video signal are compared in phase with an AFC comparison wave from line-frequency sweep system 67, and a balanced AFC control potential is developed between output electrodes 132 and 133. At the same time, local line-frequency oscillations are generated by the part of the system comprising oscillatory circuit or filter 137, 138, electron-discharge device 134, differentiating circuit 85, 86 and line-frequency sweep system 67 which are connected in a closed feedback loop having a loop voltage gain of at least unity. Ringing circuit 137, 138 is slightly detuned from the line-scanning frequency, as by adjustment of the inductance of coil 137, to introduce a predetermined shift between the phasing of the sinusoidal voltage wave applied between deflectors 43 and 44 and that of the AFC comparison wave applied from line-frequency sweep system 67 to phase detector 131. In this manner, initiation of the flyback pulse may be accomplished at an instant corresponding to or slightly preceding the leading edge of the incoming line-frequency synchronizing pulse, in spite of the fact that the balanced AFC phase detector may operate to align the median time of the synchronizing pulse with the zero-voltage points of the comparison signal.

In all the embodiments of the invention, the desired picture-phasing correction is accomplished either by actually introducing a physical asymmetry in the electrode system of the beam deflection tube or by rendering a symmetrical construction effectively asymmetrical under the influence of external circuit elements. In a more generic sense, the desired picture-phasing compensation may be effected by introducing a predetermined shift, of appropriate magnitude and direction, in the phase of the output signal from the beam deflection tube relative to that of the comparison signal applied to the AFC phase detector, and this phase shift must be introduced by means intermediate the phase detector output electrodes and the input circuit of the line-frequency sweep system. While this desired compensation may be accomplished by external circuit elements, it is preferred to provide for the desired phase shift by modification of the tube structure as described above, in order to avoid the necessity of interposing circuit elements between the phase-detector output electrodes and the power-section deflectors, since the use of direct connections between these electrodes facilitates and simplifies the tube construction.

While the present invention has been described in connection with systems of the type disclosed in the above identified Spracklen application, the same picture-decentering problem is encountered in systems of the type described in application Serial No. 139,402, and most of the techniques of the present invention may also be employed to provide a picture-phasing correction in systems of the latter type.

While particular embodiments of the present invention have been shown and described, it is apparent that various changes and modifications may be made, and it is therefore contemplated in the appended claims to cover all such changes and modifications as fall within the true spirit and scope of the invention.

I claim:

1. In combination: a first electrode system comprising an electron source and an output electrode; a second electrode system comprising an electron gun including an elongated cathode for projecting a sheet-like electron beam of substantially rectangular cross-section, means including a deflection-control system responsive to an applied alternating signal for periodically sweeping said beam back and forth transversely across a predetermined mean path, and a pair of anodes having active portions on opposite sides of and asymmetrical with respect to said mean path, said active portions being adjacent and separated by a transition line parallel to and displaced from said mean path; and means direct-coupling said output electrode to said deflection-control system.

2. In combination: a first electrode system comprising an electron source and a pair of output electrodes; a second electrode system comprising an electron gun including an elongated cathode for projecting a sheet-like electron beam of substantially rectangular cross-section, means including a pair of electrostatic-deflection electrodes and an auxiliary deflecting means for periodically sweeping said beam back and forth transversely across a predetermined mean path, and a pair of anodes having active portions on opposite sides of and asymmetrical with respect to said mean path, said active portions being adjacent and separated by a transition line parallel to and displaced from said mean path; and means direct-coupling said output electrodes to said electrostatic-deflection electrodes.

3. In combination: a first electrode system comprising an electron source and a pair of output electrodes; a second electrode system comprising an electron gun including an elongated cathode and a slotted accelerating electrode for projecting a sheet-like electron beam of substantially rectangular cross-section, means including a pair of electrostatic-deflection electrodes and an auxiliary deflection electrode that is electrically connected to said accelerating electrode for periodically sweeping said beam back and forth transversely across a predetermined mean path, and a pair of anodes having active portions on opposite sides of and asymmetrical with respect to said mean path, said active portions being adjacent and separated by a transition line parallel to and displaced from said mean path; and means direct-coupling said output electrodes to said electrostatic-deflection electrodes.

4. An electrode system comprising an electron gun including an elongated cathode and a slotted accelerating electrode for projecting a sheet-like electron beam of substantially rectangular cross-section along a predetermined axis, a pair of electrostatic-deflection control electrodes disposed on opposite sides of said axis and responsive to an applied alternating signal for periodically sweeping said beam back and forth in a transverse direction, auxiliary deflecting means for diverting the mean path of only a portion of said beam from said axis, and a pair of anodes having active portions on opposite sides of and asymmetrical with respect to said axis.

5. An electrode system comprising an electron gun including an elongated cathode and a slotted accelerating electrode for projecting a sheet-like electron beam of substantially rectangular cross-section along a predetermined axis, a pair of electrostatic-deflection electrodes disposed on opposite sides of said axis and responsive to an applied alternating signal for periodically sweeping said beam back and forth in a transverse direction, an auxiliary deflecting electrode disposed on one side of said axis and connected to said accelerating electrode for diverting the mean path of only a portion of said beam from said axis, and a pair of anodes having active portions on opposite sides of and asymmetrical with respect to said axis.

6. An electrode system comprising an electron gun including an elongated cathode and a slotted accelerating electrode for projecting a sheet-like electron beam of substantially rectangular cross-section along a predetermined axis, a pair of electrostatic-deflection electrodes disposed on opposite sides of said axis and responsive to an applied alternating signal for periodically sweeping said beam back and forth in a transverse direction, an auxiliary deflecting electrode disposed on one side of said axis and extending for at least the full height of said beam for deflecting the mean path of said beam away from said axis, an additional electrode disposed on the opposite side of said axis and extending in a direction parallel to said cathode for a distance less than the height of said beam for restoring a minor fractional portion of said beam to said axis, and a pair of anodes having active portions on opposite sides of and asymmetrical with respect to said axis.

7. An electron-discharge device comprising: an electron gun including an elongated cathode for projecting a sheet-like electron beam of substantially rectangular cross-section along a predetermined axis; an anode system effectively intercepting said axis; and means including a deflecting electrode intermediate said electron gun and said anode system, laterally spaced from said axis and extending in a direction parallel to said cathode for only a distance less than the height of said electron beam, for deflecting only a portion of said beam away from said axis.

8. An electron-discharge device comprising: an electron gun including an elongated cathode and a slotted accelerating electrode for projecting a sheet-like electron beam of substantially rectangular cross-section along a predetermined axis; an anode system effectively intercepting said axis; a deflecting electrode laterally spaced from said axis and extending in a direction parallel to said cathode for at least the full height of said electron beam; and an additional electrode disposed on the opposite side of said axis and extending in a direction parallel to said cathode for only a distance less than the height of said electron beam.

9. An electron-discharge device comprising: an electron gun including an elongated cathode and a slotted accelerating electrode for projecting a sheet-like electron beam of substantially rectangular cross-section along a predetermined axis; a pair of electrostatic-deflection electrodes disposed on opposite sides of said axis and responsive to an applied alternating signal for subjecting said beam to a transverse deflection field; an auxiliary deflecting electrode, connected to said accelerating electrode, disposed on one side of said axis and extending in a direction parallel to said cathode for at least the full height of said electron beam; an additional electrode, connected to said accelerating electrode, disposed on the opposite side of said axis and extending in a direction parallel to said cathode for only a distance less than the height of said electron beam; and a pair of anodes having active portions on opposite sides of said axis.

10. In combination: a first electrode system comprising an electron source and a pair of output electrodes; a second electrode system comprising an electron gun including an elongated cathode for projecting a sheet-like electron beam of substantially rectangular cross-section, means including a pair of electrostatic-deflection electrodes responsive to an applied alternating signal for periodically sweeping said beam back and forth transversely across a predetermined mean path, an anode having an intercepting edge parallel to and spaced from said mean path, and means for collecting electrons not intercepted by said anode; and means direct-coupling said output electrodes to said electrostatic-deflection electrodes.

11. In combination: a first electrode system comprising an electron source and a pair of output electrodes; a second electrode system comprising an electron gun including an elongated cathode for projecting a sheet-like electron beam of substantially rectangular cross-section, means including a pair of electrostatic-deflection electrodes responsive to an applied alternating signal for periodically sweeping said beam back and forth transversely across a predetermined mean path, an anode having an intercepting edge a major portion of which is parallel to and spaced from said mean path and a minor portion of which projects from said major portion to said mean path, and means for collecting electrons not intercepted by said anode; and means direct-coupling said output electrodes to said electrostatic-deflection electrodes.

12. In combination: a first electrode system comprising an electron source and a pair of output electrodes; a second electrode system comprising an electron gun including an elongated cathode for projecting a sheet-like electron beam of substantially rectangular cross-section, means including a pair of electrostatic-deflection electrodes responsive to an applied alternating signal for periodically sweeping said beam back and forth transversely across a predetermined mean path, a first anode having an intercepting edge a major portion of which is spaced from said mean path and extends in a direction substantially parallel with said cathode and a minor portion of which is provided with a substantially triangular lip projecting from said major portion and having its apex substantially tangent to said mean path, and an additional anode for collecting electrons not intercepted by said first anode; and means direct-coupling said output electrodes to said electrostatic-deflection electrodes.

13. In combination: a first electrode system comprising an electron gun for projecting a first sheet-like electron beam of substantially rectangular cross-section, a target electrode having a slot, and a pair of output electrodes for collectively receiving electrons projected through said slot; a second electrode system comprising an electron gun for projecting a second sheet-like electron beam of substantially rectangular cross-section, means including a pair of electrostatic-deflection electrodes responsive to an applied alternating signal for periodically sweeping said second beam back and forth transversely across a predetermined mean path, and an output anode having an intercepting edge parallel to and laterally displaced from said mean path; and means direct-coupling said output electrodes to said electrostatic-deflection electrodes.

References Cited in the file of this patent

UNITED STATES PATENTS

| | | |
|---|---|---|
| 1,836,569 | Benjamin | Dec. 15, 1931 |
| 2,114,613 | Schlesinger | Apr. 19, 1938 |
| 2,265,311 | Preisach et al. | Dec. 9, 1941 |
| 2,417,450 | Sears | Mar. 18, 1947 |
| 2,424,289 | Snyder et al. | July 22, 1947 |
| 2,449,339 | Sziklai | Sept. 14, 1948 |
| 2,472,779 | Selgin | June 7, 1949 |
| 2,516,752 | Carbrey | July 25, 1950 |
| 2,600,142 | Van Overbeek | June 10, 1952 |
| 2,601,415 | Oliver | June 24, 1952 |
| 2,605,350 | Wendt | July 29, 1952 |
| 2,606,300 | Adler | Aug. 5, 1952 |
| 2,611,098 | Rockwood et al. | Sept. 16, 1952 |
| 2,684,403 | Spracklen | July 20, 1954 |